March 7, 1939.  G. SOLOMON  2,150,010

TRAILER HITCH

Filed Sept. 1, 1937

WITNESSES

INVENTOR
Guillermo Solomon
BY
ATTORNEYS

Patented Mar. 7, 1939

2,150,010

UNITED STATES PATENT OFFICE 2,150,010

TRAILER HITCH

Guillermo Solomon, Santiago, Dominican Republic

Application September 1, 1937, Serial No. 161,919

2 Claims. (Cl. 280—33.15)

This invention relates to trailer hitches, an object of the invention being to provide a hitch which constitutes in effect a draw bar coupling and which can be easily and quickly operated to couple a trailer to its tower and which provides in effect a universal joint or coupling between the tower and the trailer.

A further object is to provide an improved construction and arrangement of hitch which permits a motorist to make an easy and quick coupling without the need of placing the towing car and trailer in an exact and ideal position to each other so that both parts of the coupling or hitch coincide exactly.

The invention embodies many novel features of construction and combinations and arrangements of parts, all of which will be more fully hereinafter described and pointed out in the claims.

In the accompanying drawing—

Figure 1:
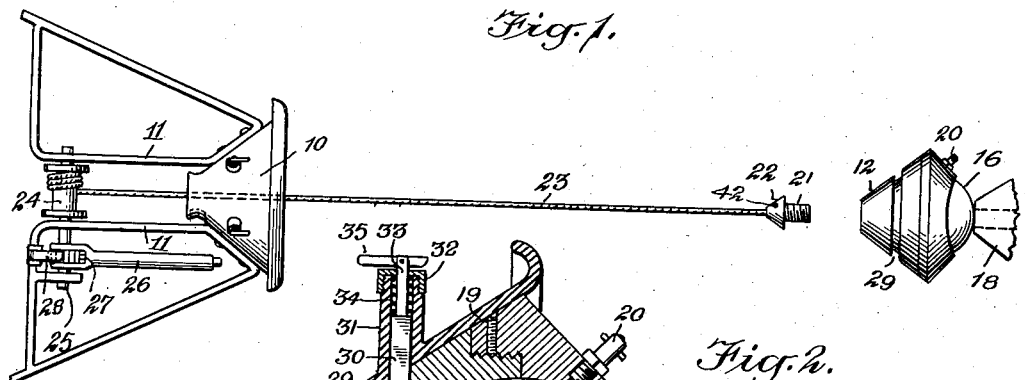
Fig. 1 is a view in elevation illustrating my improved hitch with the various parts separated.
Figure 2:
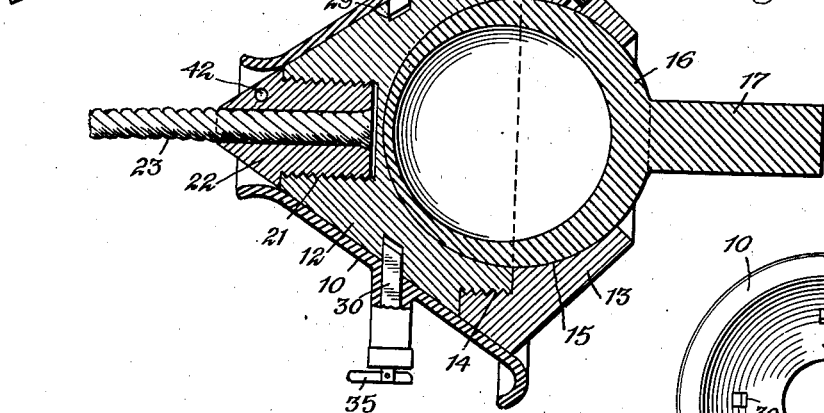
Fig. 2 is a view on a scale larger than that of Fig. 1, showing the coupling members in their coupled relationship.
Figure 3:
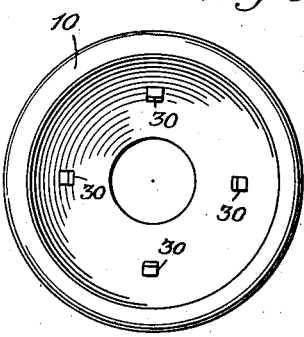
Fig. 3 is a view in end elevation of the housing.

My improved hitch includes a housing 10 of general frusto-conical shape which is fixedly secured to a trailer by means of bracket arms 11 as shown in Fig. 1, or by any other suitable means. The other member of the hitch includes several parts consisting of a body 12 and a cap ring 13 screwed on to the body as shown at 14 and forming with the body a spherical socket 15 in which a ball 16 is mounted and has universal movement within certain limits. This ball 16 is fixedly connected to a shaft 17 which in turn is secured in any approved manner to a tower indicated generally by the reference character 18. The cap ring 13 may be fixedly secured to the body 12 by means of any suitable key 19 engaging the intermeshing thread of the body and the cap ring, and a suitable grease cup 20 may be carried by the ring 13 to lubricate the ball and socket joint.

The body 12 is also of general frusto-conical shape and is adapted to fit within the body 10, and at the smaller end of the body 12 a screw-threaded socket 21 is provided receiving a screw-threaded plug 22 which is fixedly secured to a cable, chain or other suitable device 23. This cable 23 extends through the body 10 and is secured to and wound upon a windlass 24 which is secured to a shaft 25 having rotary mounting in the trailer.

26 represents a hand lever which carries a pawl 27 engaging a ratchet wheel 28 on the shaft 25 so that when this hand lever 26 is oscillated it will impart a rotary motion to shaft 25 and to the windlass 24 either to wind or unwind the cable 23 thereon.

The body 12 is formed intermediate its ends with an annular groove 29 and into this groove 29 spring-pressed pins 30 on the housing 10 are adapted to project. These pins 30 in any desired number are radially positioned around the housing and are movable longitudinally in barrels 31 affixed to the housing. These barrels 31 have cap nuts 32 screwed on their outer ends and through these cap nuts the reduced outer ends 33 of the pins project, and coil springs 34 are located in the barrels and exert inward pressure on the pins holding them in normal position.

On the outer ends of the pins 30 small levers 35 are pivotally connected intermediate their ends so that when these levers 35 are in horizontal position the pins 30 will be inwardly projected, but when the levers are placed in their vertical positions, that is, in alinement with the pins 30, the latter will be held in their retracted position.

The operation of the hitch above described is as follows: The tower and the trailer are located in as near alinement as is possible, and the plug 22 is screwed into the end of the body 12. The operator then oscillates the hand lever 26 turning the windlass 24 in the direction to wind the cable 23 thereon and draw the trailer up to the tower until the body 12 is moved into the housing 10 far enough for the pins 30 to spring into the groove 29, it being understood that the inner ends of the pins 30 are beveled so that they move outwardly by the action of the conical body 12 and then spring into the groove 29 when permitted to couple the parts together. The lever 26 may also be oscillated to unwind the cable.

Figure 4:
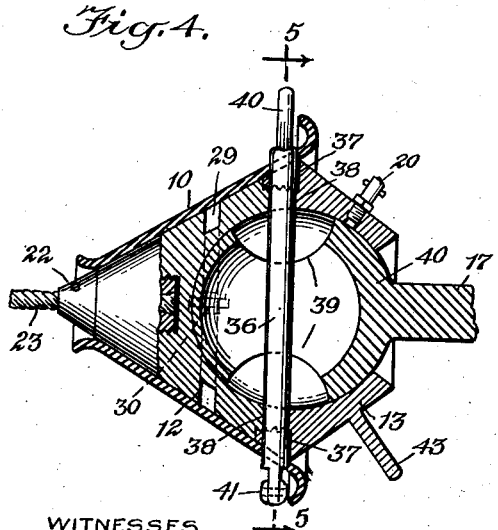
Fig. 4 is a sectional plan view illustrating a modification.
Figure 5:
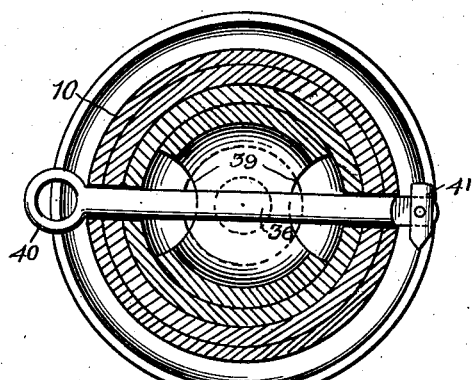
Fig. 5 is a view in transverse section on the line 5—5 of Fig. 4.

In the modification illustrated in Figs. 4 and 5 of the drawing only two vertically aligned pins 30 are employed. A horizontally positioned cross pin 36 is positioned in alined openings 37 and 38 in the cap ring 13 and body 12, respectively, and also through openings 39 in the ball 40 which corresponds to the ball 16 of the preferred form. These openings 39 are sufficiently large to allow the ball its desired universal movement, and it will be noted that the pin 36 in the modified form acts as an added feature of security as it prevents any uncoupling relation between the ball and the body 12.

The pin 36 is preferably formed with an eye 40 at one end to facilitate the manipulation thereof and with a pivoted cross pin 41 at its other end to prevent accidental removal of the pin 36.

The plug 22 is preferably provided with a hole 42 to receive a lever to turn the same and a hand knob 43 is preferably formed on the member 13 as shown.

While I have illustrated and described what I believe to be the preferred embodiments of my invention, it is obvious that various changes may be made in the general form and arrangement of parts without departing from the invention, and hence I do not limit myself to specific details but consider myself at liberty to make such changes and alterations as fairly fall within the spirit and scope of the appended claims.

I claim:

1. A trailer hitch, including a housing adapted to be secured to a trailer, a body adapted to be rotatably and removably secured in said housing, a cap ring screwed on to the body, said cap ring and body forming a spherical socket, a ball in the socket, means for securing said ball to a tower, a screw plug extending longitudinally of said body screwed in the end of the body, a cable secured to the screw plug and extending axially thereof, said cable projecting through the housing, a windlass on which said cable is adapted to be wound, and means for turning the windlass.

2. A trailer hitch, including a housing adapted to be secured to a trailer, a body adapted to be rotatably and removably secured in the housing, a cap ring secured on to said body, said cap ring and body forming a spherical socket, a ball in the socket, means connecting said ball to a tower, a screw plug removably secured in the end of the body and extending longitudinally thereof, a cable secured to the screw and projecting axially of said screw plug through the housing, a windlass on which said cable is wound, and means for turning the windlass, said last mentioned means comprising a ratchet wheel and pawl operatively connected with the windlass, a hand lever and a pawl on the hand lever engaging the ratchet wheel.

GUILLERMO SOLOMON.